(12) United States Patent
Kidman (10) Patent No.: US 8,029,301 B2
(45) Date of Patent: Oct. 4, 2011

(54) WIDE SAFETY STRAP FOR ELECTRICAL FIXTURES

(75) Inventor: Brent L. Kidman, Spanish Fork, UT (US)

(73) Assignee: Cheetah USA Corp., Sandy, UT (US)

( * ) Notice: Subject to any disclaimer, the term of this patent is extended or adjusted under 35 U.S.C. 154(b) by 0 days.

(21) Appl. No.: 12/610,971

(22) Filed: Nov. 2, 2009

(65) Prior Publication Data

US 2010/0163267 A1   Jul. 1, 2010

Related U.S. Application Data

(63) Continuation of application No. 12/014,061, filed on Jan. 14, 2008, now Pat. No. 7,611,364, which is a continuation of application No. 11/605,721, filed on Nov. 29, 2006, now Pat. No. 7,318,732, which is a continuation of application No. 11/328,650, filed on Jan. 10, 2006, now Pat. No. 7,284,996.

(60) Provisional application No. 60/643,018, filed on Jan. 11, 2005, provisional application No. 60/674,499, filed on Apr. 25, 2005, provisional application No. 60/697,913, filed on Jul. 7, 2005.

(51) Int. Cl.
*H01R 13/44* (2006.01)

(52) U.S. Cl. .................. 439/136; 439/535; 174/66

(58) Field of Classification Search ............ 439/136, 439/535, 536; 174/66
See application file for complete search history.

(56) References Cited

U.S. PATENT DOCUMENTS

| | | | |
|---|---|---|---|
| 867,624 A | 10/1907 | Warthen |
| 1,113,762 A | 10/1907 | Eckman |
| 1,726,429 A | 8/1929 | Ferris |
| 1,785,463 A | 12/1930 | Strongson |
| 1,840,582 A | 1/1932 | Hubbell |
| 1,933,358 A | 10/1933 | Almcrantz |
| 1,964,535 A | 6/1934 | Schreiber |
| 2,043,865 A | 9/1936 | Place |
| 2,149,719 A | 3/1939 | Arnest |
| 2,297,862 A | 10/1942 | Bachmann |
| 2,512,188 A | 6/1950 | Wait et al. |
| 2,515,820 A | 7/1950 | Clark |
| 2,740,873 A | 4/1956 | Cronk |
| 2,794,890 A | 6/1957 | Taylor |

(Continued)

FOREIGN PATENT DOCUMENTS

CA   1277409   12/1990

(Continued)

OTHER PUBLICATIONS

U.S. Appl. No. 11/438,481, filed May 22, 2006, Kidman.

(Continued)

*Primary Examiner* — Hae Moon Hyeon
(74) *Attorney, Agent, or Firm* — Foley & Lardner LLP (57) ABSTRACT

An electrical fixture having a front side and a back side and defining longitudinal, lateral, and transverse directions substantially orthogonal to one another. The electrical fixture may include a body, a flange, and at least one anchor. The body may have at least one terminal extending laterally to the exterior thereof. The flange may extend laterally and longitudinally from the body to substantially preclude transverse access to the terminal from the front side of the electrical fixture. The at least one anchor may transversely extend from the flange to provide securement with a connection box.

26 Claims, 12 Drawing Sheets

U.S. PATENT DOCUMENTS

| | | |
|---|---|---|
| 2,828,394 A | 3/1958 | Mayzik |
| 2,860,317 A | 11/1958 | Johnson |
| 2,920,303 A | 1/1960 | Johnson |
| 2,934,590 A | 4/1960 | Thompson et al. |
| 2,980,756 A | 4/1961 | Kelleher |
| D196,838 S | 11/1963 | Cleminshaw |
| 3,155,808 A | 11/1964 | Wiley |
| 3,168,612 A | 2/1965 | Sorenson |
| 3,437,737 A | 4/1969 | Wagner |
| 3,488,428 A | 1/1970 | Smith |
| 3,609,213 A | 9/1971 | Winter et al. |
| 3,662,085 A | 5/1972 | Robinson et al. |
| 3,689,868 A | 9/1972 | Snyder |
| 3,735,020 A | 5/1973 | Licata |
| 3,767,151 A | 10/1973 | Seal et al. |
| 3,770,872 A | 11/1973 | Brown |
| 3,770,920 A | 11/1973 | Poliak |
| 3,814,834 A | 6/1974 | Glader |
| 3,848,764 A | 11/1974 | Salg |
| 3,859,454 A | 1/1975 | Mann |
| 3,905,570 A | 9/1975 | Nieuwveld |
| 3,908,235 A | 9/1975 | Telliard et al. |
| 3,926,330 A | 12/1975 | Deming et al. |
| 3,928,716 A | 12/1975 | Marrero |
| 3,953,933 A | 5/1976 | Goldstein |
| 3,955,463 A | 5/1976 | Hoehn |
| 3,982,084 A | 9/1976 | Cooperstein |
| 4,007,852 A | 2/1977 | Gernhardt |
| 4,057,164 A | 11/1977 | Maier |
| 4,062,470 A | 12/1977 | Boteler |
| 4,098,423 A | 7/1978 | Marrero |
| 4,105,862 A | 8/1978 | Hoehn |
| RE29,752 E | 9/1978 | Jaconette, Jr. |
| 4,165,443 A | 8/1979 | Figart et al. |
| 4,263,472 A | 4/1981 | Maheu |
| 4,273,957 A | 6/1981 | Kolling, Jr. |
| 4,281,773 A | 8/1981 | Mengeu |
| 4,295,003 A | 10/1981 | Borja et al. |
| 4,304,958 A | 12/1981 | Neff et al. |
| 4,306,109 A | 12/1981 | Nattel |
| 4,311,422 A | 1/1982 | Jackovitz |
| 4,315,100 A | 2/1982 | Haslbeck et al. |
| 4,316,999 A | 2/1982 | Nattel |
| 4,340,795 A | 7/1982 | Arthur |
| 4,348,547 A | 9/1982 | Bowden, Jr. |
| 4,355,198 A | 10/1982 | Gartland, Jr. |
| D269,510 S | 6/1983 | Doyle et al. |
| 4,389,535 A | 6/1983 | Slater et al. |
| 4,399,922 A | 8/1983 | Horsley |
| 4,408,696 A | 10/1983 | Crosson |
| 4,436,952 A | 3/1984 | Lockwood |
| 4,489,297 A | 12/1984 | Haydon et al. |
| 4,500,746 A | 2/1985 | Meehan |
| 4,534,486 A | 8/1985 | Eidson |
| 4,580,689 A | 4/1986 | Slater |
| 4,605,816 A | 8/1986 | Jorgensen et al. |
| 4,631,354 A | 12/1986 | Boteler |
| 4,645,089 A | 2/1987 | Horsley |
| 4,669,797 A | 6/1987 | Bourdon |
| 4,669,804 A | 6/1987 | Munroe |
| 4,688,693 A | 8/1987 | Medlin, Jr. |
| 4,724,282 A | 2/1988 | Troder |
| 4,732,356 A | 3/1988 | Medlin, Sr. |
| 4,733,330 A | 3/1988 | Tanaka et al. |
| 4,793,059 A | 12/1988 | Moreau et al. |
| 4,810,199 A | 3/1989 | Kar |
| 4,832,297 A | 5/1989 | Carpenter |
| 4,833,277 A | 5/1989 | Jacoby et al. |
| 4,835,343 A | 5/1989 | Graef et al. |
| 4,837,406 A | 6/1989 | Emmons |
| 4,843,189 A | 6/1989 | Jorgensen et al. |
| 4,844,275 A | 7/1989 | Schnell et al. |
| 4,898,357 A | 2/1990 | Jorgensen et al. |
| 4,903,851 A | 2/1990 | Slough |
| 4,909,692 A | 3/1990 | Hendren |
| 4,927,373 A | 5/1990 | Dickie |
| 4,936,396 A | 6/1990 | Lockwood |
| 4,939,383 A | 7/1990 | Tucker et al. |
| 4,948,317 A | 8/1990 | Marinaro |
| 4,954,667 A | 9/1990 | Jorgensen et al. |
| 4,960,964 A | 10/1990 | Schnell et al. |
| 4,964,525 A | 10/1990 | Coffey et al. |
| 4,974,888 A | 12/1990 | Childers |
| 4,978,092 A | 12/1990 | Nattel |
| 5,031,785 A | 7/1991 | Lemme |
| 5,031,789 A | 7/1991 | Dauberger |
| 5,041,698 A | 8/1991 | Takagi et al. |
| 5,064,386 A | 11/1991 | Dale et al. |
| 5,073,681 A | 12/1991 | Hubben et al. |
| 5,084,596 A | 1/1992 | Borsh et al. |
| 5,117,122 A | 5/1992 | Hogarth et al. |
| D327,212 S | 6/1992 | Hubben et al. |
| 5,135,411 A | 8/1992 | Wiley et al. |
| 5,153,816 A | 10/1992 | Griffin |
| 5,170,013 A | 12/1992 | Borsh et al. |
| 5,170,014 A | 12/1992 | Borsh |
| 5,176,345 A | 1/1993 | Medlin |
| 5,180,886 A | 1/1993 | Dierenbach et al. |
| 5,189,259 A | 2/1993 | Carson et al. |
| 5,207,317 A | 5/1993 | Bryde et al. |
| D336,744 S | 6/1993 | Kahn et al. |
| 5,223,673 A | 6/1993 | Mason |
| 5,224,673 A | 7/1993 | Webb |
| 5,277,602 A | 1/1994 | Yi |
| 5,289,934 A | 3/1994 | Smith et al. |
| 5,306,178 A | 4/1994 | Huang |
| D346,949 S | 5/1994 | Comerci et al. |
| RE34,786 E | 11/1994 | Slough |
| 5,375,728 A | 12/1994 | West |
| D354,943 S | 1/1995 | Williams et al. |
| 5,407,088 A | 4/1995 | Jorgensen et al. |
| 5,415,564 A | 5/1995 | Winter et al. |
| D360,876 S | 8/1995 | Hughes |
| 5,456,373 A | 10/1995 | Ford |
| D364,141 S | 11/1995 | Hanna et al. |
| 5,477,010 A | 12/1995 | Buckshaw et al. |
| 5,538,437 A | 7/1996 | Bates et al. |
| 5,590,858 A | 1/1997 | Bourassa et al. |
| 5,594,208 A | 1/1997 | Cancellieri et al. |
| 5,595,362 A | 1/1997 | Rinderer et al. |
| 5,596,174 A | 1/1997 | Sapienza |
| 5,599,512 A | 2/1997 | Latulippe et al. |
| 5,623,124 A | 4/1997 | Chien |
| 5,675,125 A | 10/1997 | Hollinger |
| 5,696,350 A | 12/1997 | Anker |
| 5,706,559 A | 1/1998 | Oliver et al. |
| 5,723,817 A | 3/1998 | Arenas et al. |
| 5,744,750 A | 4/1998 | Almond |
| D401,566 S | 11/1998 | Gesmondi et al. |
| 5,833,110 A | 11/1998 | Chandler et al. |
| 5,835,980 A | 11/1998 | Houssian |
| 5,842,822 A | 12/1998 | Everett et al. |
| 5,863,016 A | 1/1999 | Makwinski et al. |
| D405,760 S | 2/1999 | Yu |
| D405,761 S | 2/1999 | Yu |
| 5,895,888 A | 4/1999 | Arenas et al. |
| 5,900,584 A | 5/1999 | Cady et al. |
| 5,950,812 A | 9/1999 | Tanacan et al. |
| 5,965,845 A | 10/1999 | Reiker |
| 5,965,846 A | 10/1999 | Shotey et al. |
| 6,005,308 A | 12/1999 | Bryde et al. |
| D419,531 S | 1/2000 | Keung et al. |
| 6,023,021 A | 2/2000 | Matthews et al. |
| 6,036,536 A | 3/2000 | Chiu |
| 6,040,967 A | 3/2000 | DiSalvo |
| 6,051,787 A | 4/2000 | Rintz |
| 6,066,805 A | 5/2000 | Bordwell et al. |
| 6,093,890 A | 7/2000 | Gretz |
| 6,107,568 A | 8/2000 | Schnell et al. |
| 6,109,937 A | 8/2000 | Bonilla et al. |
| D430,539 S | 9/2000 | Leopold et al. |
| 6,147,304 A | 11/2000 | Doherty |
| 6,160,219 A | 12/2000 | Maltby et al. |
| 6,166,329 A | 12/2000 | Oliver et al. |
| 6,184,466 B1 | 2/2001 | Eder et al. |
| 6,191,361 B1 | 2/2001 | Matty |
| 6,207,898 B1 | 3/2001 | Reiker |

| | | |
|---|---|---|
| 6,218,617 B1 | 4/2001 | Estanislao et al. |
| 6,229,087 B1 | 5/2001 | Archer |
| 6,257,925 B1 | 7/2001 | Jones |
| 6,341,981 B1 | 1/2002 | Gorman |
| 6,347,959 B2 | 2/2002 | Sawayanagi |
| 6,355,885 B1 | 3/2002 | Rintz et al. |
| 6,365,831 B1 | 4/2002 | Rupp et al. |
| 6,368,141 B1 | 4/2002 | VanAntwerp et al. |
| 6,376,770 B1 | 4/2002 | Hyde |
| 6,384,334 B1 | 5/2002 | Webb |
| 6,410,850 B1 | 6/2002 | Abel et al. |
| 6,423,897 B1 | 7/2002 | Roesch et al. |
| 6,441,304 B1 | 8/2002 | Currier et al. |
| 6,452,813 B1 | 9/2002 | Gretz |
| 6,533,225 B1 | 3/2003 | Berges et al. |
| 6,552,269 B1 | 4/2003 | Conner |
| 6,609,927 B2 | 8/2003 | Kidman |
| 6,616,005 B1 | 9/2003 | Pereira et al. |
| 6,624,355 B1 | 9/2003 | Gretz |
| D484,392 S | 12/2003 | Mayo et al. |
| 6,679,725 B2 | 1/2004 | Kidman |
| 6,765,149 B1 | 7/2004 | Ku |
| 6,814,611 B1 | 11/2004 | Torres |
| 6,840,800 B2 | 1/2005 | Kidman |
| 6,875,940 B2 | 4/2005 | Endres et al. |
| 6,884,111 B2 | 4/2005 | Gorman |
| 6,891,117 B1 | 5/2005 | Gouhl et al. |
| 6,943,297 B2 | 9/2005 | Capella |
| 6,949,708 B1 | 9/2005 | Hausen et al. |
| D512,377 S | 12/2005 | Fort et al. |
| 6,974,910 B2 | 12/2005 | Rohmer |
| D517,729 S | 3/2006 | Angeletta |
| 7,030,319 B2 | 4/2006 | Johnsen et al. |
| 7,048,575 B2 | 5/2006 | Kidman |
| 7,049,511 B2 | 5/2006 | Gledhill et al. |
| 7,052,314 B1 | 5/2006 | Rose |
| 7,071,414 B2 | 7/2006 | Kim |
| 7,075,009 B1 | 7/2006 | Rohmer |
| 7,077,695 B2 | 7/2006 | Kidman |
| 7,077,706 B1 | 7/2006 | Yang |
| 7,083,467 B2 | 8/2006 | Kidman |
| 7,102,081 B2 | 9/2006 | Xu et al. |
| 7,118,413 B2 | 10/2006 | Kidman |
| 7,122,740 B2 | 10/2006 | Xu et al. |
| 7,122,753 B1 | 10/2006 | Davis |
| 7,122,754 B2 | 10/2006 | Endres et al. |
| 7,126,070 B2 | 10/2006 | Endres et al. |
| D534,875 S | 1/2007 | Wu |
| 7,279,636 B2 | 10/2007 | Oddsen et al. |
| 7,284,996 B2 * | 10/2007 | Kidman .................. 439/136 |
| 7,306,482 B1 | 12/2007 | Kidman |
| D558,676 S | 1/2008 | Fort et al. |
| 7,318,732 B2 * | 1/2008 | Kidman .................. 439/136 |
| D563,909 S | 3/2008 | Kidman |
| 7,342,173 B1 | 3/2008 | Kidman |
| D571,729 S | 6/2008 | Kidman |
| D571,730 S | 6/2008 | Kidman |
| D573,006 S | 7/2008 | Kidman |
| 7,395,598 B2 | 7/2008 | Kidman |
| D576,866 S | 9/2008 | Kidman |
| D576,961 S | 9/2008 | Kidman |
| D576,962 S | 9/2008 | Kidman |
| D577,985 S | 10/2008 | Kidman |
| D580,740 S | 11/2008 | Kidman |
| 7,463,124 B2 | 12/2008 | DiSalvo et al. |
| 7,494,371 B2 | 2/2009 | Kidman |
| D596,925 S | 7/2009 | Kidman |
| 7,611,364 B2 * | 11/2009 | Kidman .................. 439/136 |
| 2002/0020542 A1 | 2/2002 | Reiker |
| 2003/0014939 A1 | 1/2003 | DeWall |
| 2003/0079898 A1 | 5/2003 | Kidman |
| 2003/0109173 A1 | 6/2003 | Kidman |
| 2003/0226681 A1 | 12/2003 | Lindenstraus et al. |
| 2003/0226682 A1 | 12/2003 | Tufano et al. |
| 2003/0226683 A1 | 12/2003 | Tufano et al. |
| 2004/0242061 A1 | 12/2004 | Gledhill et al. |
| 2006/0048964 A1 | 3/2006 | Rick |
| 2006/0086525 A1 | 4/2006 | Xu et al. |

FOREIGN PATENT DOCUMENTS

| | | |
|---|---|---|
| WO | WO 02/071426 | 9/2002 |
| WO | WO 2006/091275 | 8/2006 |

OTHER PUBLICATIONS

U.S. Appl. No. 12/014,051, filed Jan. 14, 2008.
U.S. Appl. No. 12/391,139, filed Feb. 23, 2009.
Entratech Systems, "Infoplate recessed wall outlet system, designed for appealing aesthetics and versatile function," http://www.entratechsystems.com/infoplace.html, Apr. 11, 2003, pp. 1-4.
Entratech Systems, "Instructions and Specifications," Infoplate plus, Sandusky, Ohio; 2001, pp. 1-2.
Hubbell, "Self Contained Wiring Devices," Wirecon Installation Guide, location unknown, 2000, pp. 1-20.
Leviton, "Decora Plus Snap-On Wallplates," http://www.leviton.com/sections/prodinfo/decora/sheets/s5c7p9.htm, Jun. 7, 2001, pp. 1-2.
Pass and Seymour Legrand, "Self Contained Devices," 2005, pp. 1-6.
Pass and Seymour Legrand, "Wiring Devices for Manufactured Housing, Panelized and Modular Construction, and Recreational Vehicles," location and date unknown, pp. 1-5.
International Search Report mailed Aug. 28, 2002 in PCT/US2002/007472, 2 pages.
International Search Report mailed Dec. 6, 2006 in PCT/US2006/000879, 3 pages.
Final Office Action mailed Apr. 27, 2009 in U.S. Appl. No. 12/014,061, 8 pages.
Final Office Action mailed Jan. 12, 2009 in U.S. Appl. No. 12/014,061.
Non-Final Office Action mailed Feb. 22, 2007 in U.S. Appl. No. 11/605,721, 5 pages.
Non-Final Office Action mailed Aug. 1, 2007 in U.S. Appl. No. 11/605,721, 6 pages.
Non-Final Office Action mailed Jul. 12, 2006 in U.S. Appl. No. 11/328,650, 10 pages.
Non-Final Office Action mailed Jun. 6, 2008 in U.S. Appl. No. 12/014,061, 6 pages.
Non-Final Office Action mailed Nov. 21, 2006 in U.S. Appl. No. 11/328,650, 6 pages.
Notice of Allowance mailed Apr. 23, 2007 in U.S. Appl. No. 11/328,650, 6 pages.
Notice of Allowance mailed Jul. 2, 2009 in U.S. Appl. No. 12/014,061, 6 pages.
Notice of Allowance mailed Nov. 5, 2007 in U.S. Appl. No. 11/605,721, 6 pages.
Supplemental Notice of Allowance mailed Aug. 21, 2007 in U.S. Appl. No. 11/328,650, 2 pages.

* cited by examiner

WIDE SAFETY STRAP FOR ELECTRICAL FIXTURES

RELATED APPLICATIONS

The present application is a continuation of U.S. patent application No. 12/014,061 filed Jan. 14, 2008, now U.S. Pat. No. 7,611,364, which is a continuation of U.S. patent application No. 11/605,721 filed Nov. 29, 2006, now U.S. Pat. No. 7,318,7326, which is a continuation of U.S. patent application No. 11/328,650 filed Jan. 10, 2006, now U.S. Pat. No. 7,284,996, which claims the benefit of: 1) U.S. Provisional Patent Application No. 60/643,018 filed Jan. 11, 2005; 2) U.S. Provisional Patent Application No. 60/674,499 filed on Apr. 25, 2005; and 3) U.S. Provisional Patent Application No. 60/697,913 filed on Jul. 7, 2005, the full disclosures of which are hereby incorporated herein by reference.

BACKGROUND

1. The Field of the Invention

This invention relates to electrical devices and, more particularly, to novel systems and methods for securing face plates to electrical outlets, switches, or the like.

2. The Background Art

Typically, the structures used to connect a face plate to an electrical fixture (e.g., outlet, switch, etc.) are limited by safety concerns. Specifically, it was believed that the connection between the decorative face plate and the electrical fixture must be of a certain strength to ensure that someone (e.g., a child) could not inadvertently remove the face plate, contact the terminals of the electrical fixture, and receive an electrical shock. This presumes that the fixture has no such protection absent the decorative face plate. It is time to eliminate that presumption.

What is needed is a new apparatus and method for preventing someone from inadvertently contacting the terminals on an electrical fixture, even when no decorative face plate is in place. By so doing, new structures that are more convenient, aesthetically pleasing, and the like may be used to secure a face plate to an electrical fixture. Moreover, new attachment schemes, greater ease of installation, more decorative freedom, and the like may be more readily available under such relaxed structural requirements.

BRIEF SUMMARY OF THE INVENTION

In view of the foregoing, in accordance with the invention as embodied and broadly described herein, a method and apparatus are disclosed in one embodiment of the present invention as including an electrical fixture, having a longitudinal direction, and fasteners for securement within a connection box. Such an electrical fixture may include a main body with a strap or flange extending laterally (e.g., side-to-side) and longitudinally away therefrom. In some embodiments, the flange may form a skirting beyond the side of the fixture, thus limiting access from the front of the electrical fixture to the terminals located on the sides (laterally) or back of the body. Accordingly, when an electrical fixture is secured to a connection box, the skirting may prevent inadvertent contact with the terminals and thereby reduce the risk of electric shock.

In selected embodiments, the skirting of an electrical fixture may have a width in the lateral direction sufficient to cooperate with a wall of the connection box, effectively forming an enclosure that "passes code" without the addition of a face plate. That is, the skirting may extend in the lateral direction an amount sufficient to stop objects of a codified size from being inserted within the connection box to the point where they may contact a terminal. Additionally, the width of the skirting may be selected to permit multiple electrical fixtures to be installed laterally adjacent one another in a multi-gang connection box. The skirting may extend in the longitudinal direction sufficiently to hold (e.g., register) the electrical fixture flush with any wall paneling surrounding the connection box.

In selected embodiments, a flange may include one or more apertures to accommodate the securement of an anchor for connecting the electrical fixture to a connection box. Additional apertures may provide locations for the engagement prongs (e.g., barbs, bayonets, slides, fingers, etc.) of a face plate to engage the flange. For example, face plates in accordance with the present invention may have engagement prongs. The prongs may be inserted through apertures in a corresponding electrical fixture to maintain the face plate aligned securely thereagainst.

In certain embodiments, it may be desirable to use a screwless face plate in accordance with the present invention on a conventional electrical fixture. In such embodiments, an adapter may include the skirting and apertures necessary to interface between a face plate in accordance with the present invention and the conventional electrical fixture. If desired, the fasteners used to secure a conventional electrical fixture to a connection box may also secure the adapter to the conventional electrical fixture. Thus, for example, the adapted, conventional fixture may then include on its front a wide strap for receiving a "new" style of face plate and on its back a quick-connecting anchor.

In selected embodiments, the exterior face of a face plate may have a coating or laminant applied thereto to provide a particular pattern, appearance, style, finish, or the like. For example, in selected embodiments, a thin metal layer may be applied to the exterior face of a face plate. Thus the metal layer is electrically isolated from the fixture. In such embodiments, it may be desired or necessary to ground such metal portions of a face plate. Accordingly, if desired or necessary, an electrical fixture may include a grounding clip in accordance with the present invention.

A grounding clip in accordance with the present invention may be any device that creates a ground path between the metal portion or portions of a face plate and a grounding wire within the connection box. In some embodiments, a grounding clip may engage the skirting of an electrical fixture and extend forward to contact the metal portion or portions of a face plate. A grounding clip may also include a wire lead extending backward toward the interior of the connection box. Accordingly, the wire lead may facilitate connection between the clip and the grounding wire within the connection box.

In certain embodiments, a clear path may be provided between the grounding clip and the metal portion or portions (e.g., covering) of the face plate. For example, in one embodiment, the back surface of a metal covering may be exposed in one or more areas to be positioned transversely (e.g., front or back directions) adjacent certain portions of the skirting. Accordingly, a grounding clip positioned on the skirting may extend in the lateral direction from the body of the electrical fixture to make grounding contact with the metal covering. If desired or necessary, more than one grounding clip may be applied to an electrical fixture. For example, a first grounding clip may ground a first metal portion of a face plate, while a second grounding clip may ground a second metal portion of the face plate.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE ILLUSTRATED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments in accordance with the invention. The illustrated embodiments of the invention will be best understood by reference to the drawings, wherein like parts are designated by like numerals throughout.

Figure 1:
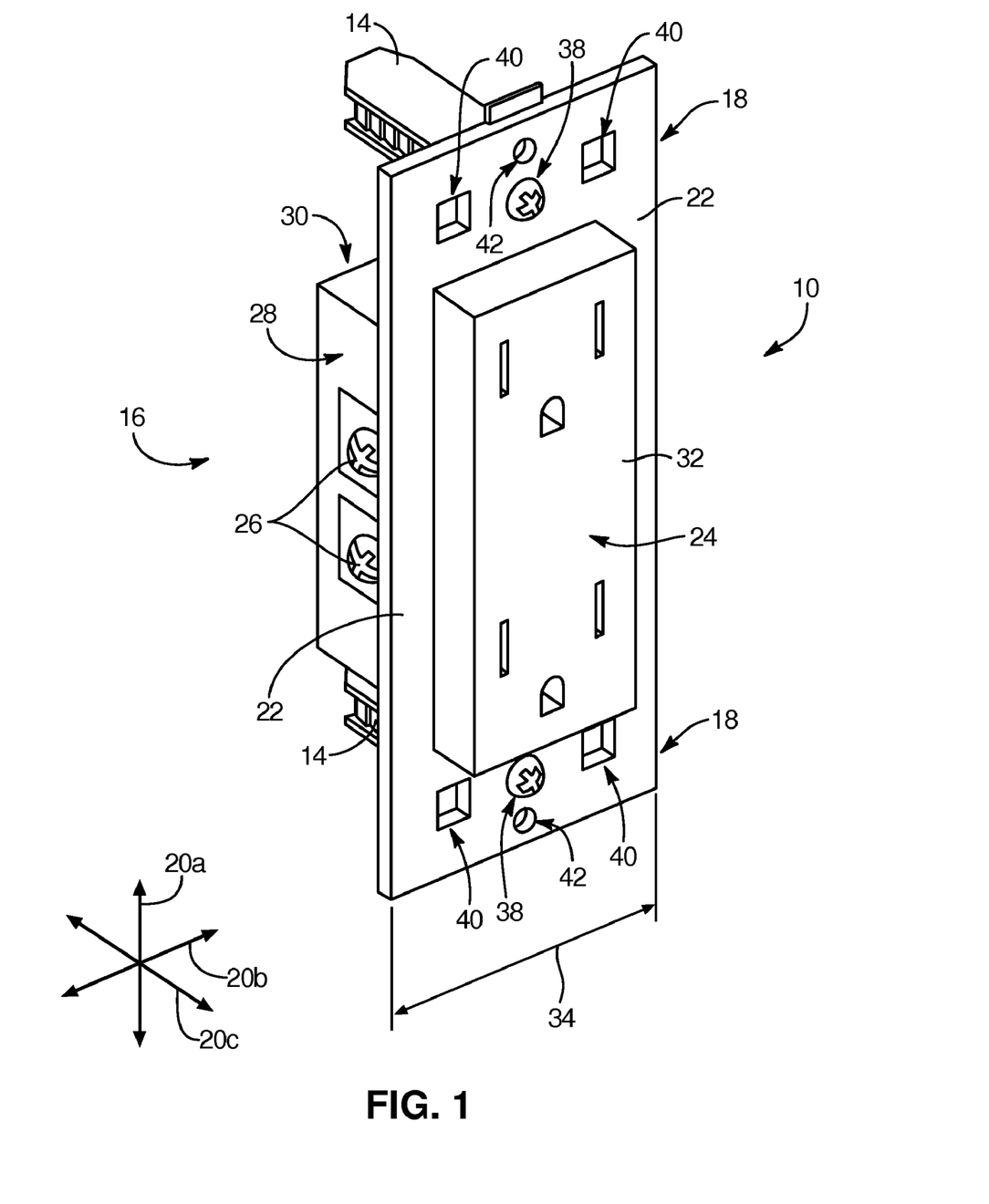
FIG. 1 is a perspective view of one embodiment of an electrical fixture having a wide safety strap in accordance with the present invention.
Figure 2:
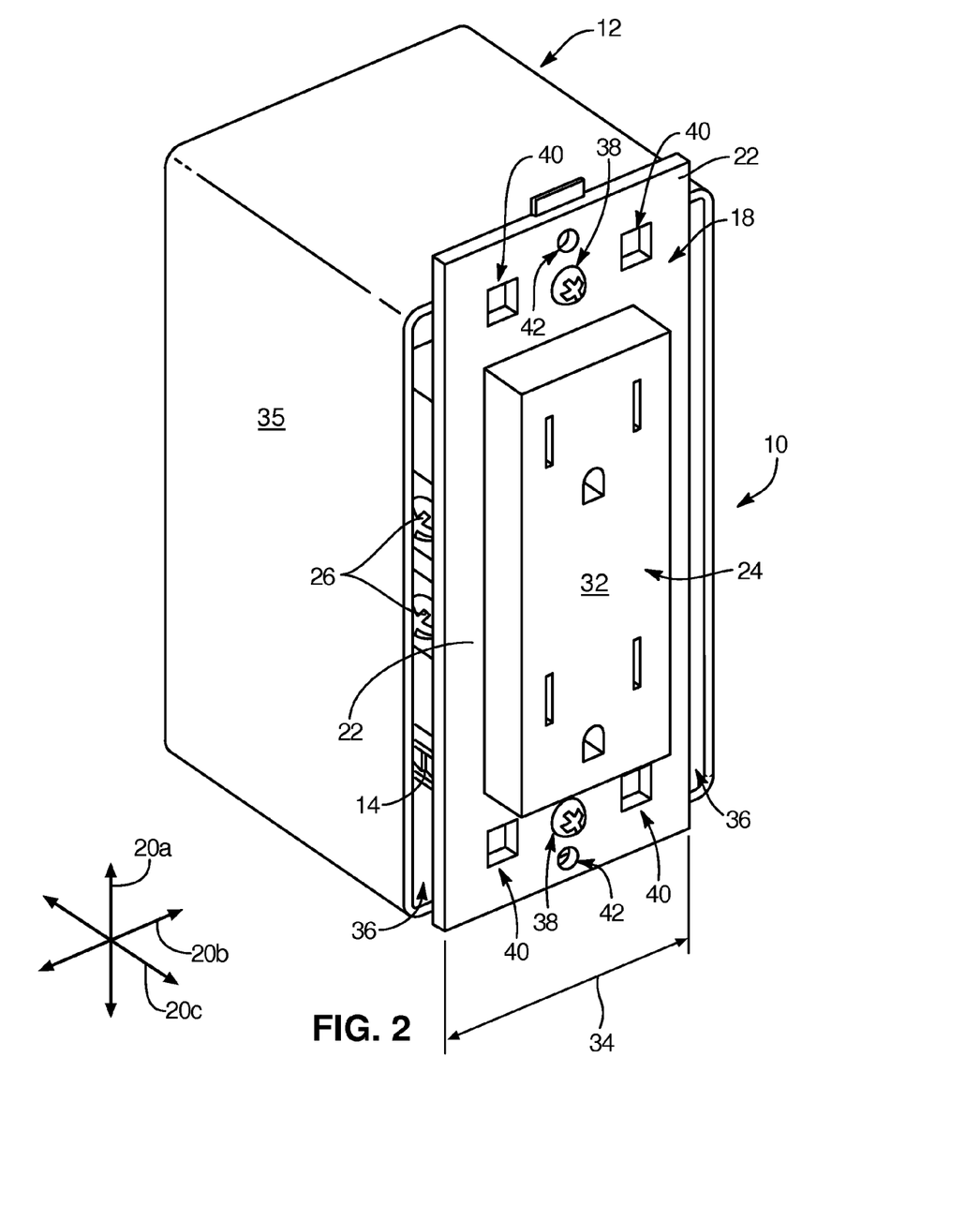
FIG. 2 is a perspective view of the electrical fixture of FIG. 1 applied to a connection box in accordance with the present invention.

Referring to FIGS. 1-2, in selected embodiments in accordance with the present invention, an electrical fixture 10 (e.g., outlet, switch, etc.) may secure to a connection box 12 in any suitable manner. For example, in some embodiments, one or more anchors 14 extending from an electrical fixture 10 may engage one or more receivers formed in a corresponding connection box 12. Such securements are disclosed in U.S. Pat. No. 6,840,800, issued Jan. 11, 2005 and entitled DEFLECTING SECUREMENT ANCHOR FOR ELECTRICAL FIXTURES, which is incorporated herein by reference.

In certain embodiments, electrical fixtures 10 in accordance with the present invention may include a main body 16 with a strap 18 or flange 18 extending away therefrom in longitudinal 20a and lateral 20b directions. In some embodiments, the flange 18 of an electrical fixture 10 may form a skirting 22 limiting access from the front 24 of the electrical fixture 10 to the terminals 26 located on the sides 28 or back 30 of the body 16. Accordingly, when an electrical fixture 10 is secured to a connection box 12, the skirting 22 may prevent inadvertent contact with the terminals 26 and, thereby, reduce the risk of electric shock.

Skirting 22 in accordance with the present invention may be formed of any suitable materials. Suitable materials may include conductors as well as dielectrics. For example, in one embodiment, the skirting 22 may be formed of a polymer exhibiting dielectric properties. In selected embodiments, the skirting 22 may be monolithically formed (e.g., one piece) or even homogeneously formed (e.g., molded as a single material) with the face 32 of the body 16.

Skirting 22 in accordance with the present invention may have any suitable dimension. For example, in selected embodiments, the skirting 22 may have a width 34 in the lateral direction 20b sufficient to cooperate with wall 35 of the connection box 12 in forming an enclosure that "passes code" without the addition of a face plate. That is, the skirting 22 may extend in the lateral direction 20b an amount sufficient to stop objects of a codified size from being inserted within the connection box 12 (e.g., within the gap 36 between the skirting 22 and the open face of the connection box 12) to the point where they may contact a terminal 26. Additionally, the width 34 of the skirting 22 may be selected to permit multiple electrical fixtures 10 to be installed laterally 20b adjacent one another in a multi-gang connection box 12. In certain embodiments, the skirting 22 may extend in the longitudinal direction 20a sufficient to hold the electrical fixture 10 flush with any wall paneling surrounding the connection box 12.

In selected embodiments, a flange 18 may include one or more apertures 38 to accommodate the securement of an anchor 14. Additional apertures 40 may provide locations for the engagement prongs of a face plate 20 to engage the flange 18. Still other apertures 42 in the flange 18 may accommodate screws for securing traditional face plates.

Referring to FIGS. 3-6, in certain applications, screws and other securement devices may be unsightly. In these applications it may be desirable to provide a snap-on face plate 44 to provide fast securement without the use of screws. Face plates 44 in accordance with the present invention may have engagement prongs 46. The prongs 46 may be inserted through apertures 40 in a corresponding electrical fixture 10 to maintain the face plate 44 aligned securely thereagainst.

In selected embodiments in accordance with the present invention, an installer may first connect an electrical fixture 10 to the lines or wires housed in a connection box 12. A face plate 44 may be installed by simply pressing the engagement prongs 46 through the appropriate apertures 40 in the electrical fixture 10. Once an electrical fixture 10 has been connected to the lines and a face plate 44 applied, the electrical fixture 10 may be secured to the connection box 12 by inserting one or more of the attached anchors 14 into corresponding receivers associated with the connection box 12. The anchors 14 may be inserted a selected distance into the receivers until the face plate 44 is properly positioned.

Engagement prongs 46 in accordance with the present invention may be formed to have multiple extensions 48. The extensions 48 may be secured to the face plate 44 by flexible necks 50. A flex clearance 52 may be provided between the extensions 48 so that as the prong 46 is inserted 54 through an aperture 40, the extensions 48 deflect inward 56. Once the prong 46 has passed 58 through the aperture 40, the extensions 48 may substantially resiliently return to their neutral position and engage the edges of the aperture 40.

In selected embodiments, the extensions 48 may be shaped to release at a desired removal loading. Thus, once the face plate 44 is removed, it may be used again. For example, the extensions 48 may be provided with a taper 60. The taper 60 may allow each extension 48 to gradually flex and bend inward 56 into the flex clearance 52 as the face plate 44 is pulled away from the electrical fixture 10. The taper 60 may also tend to bias the engagement prongs 46 into complete engagement with the apertures 40.

Figure 3:
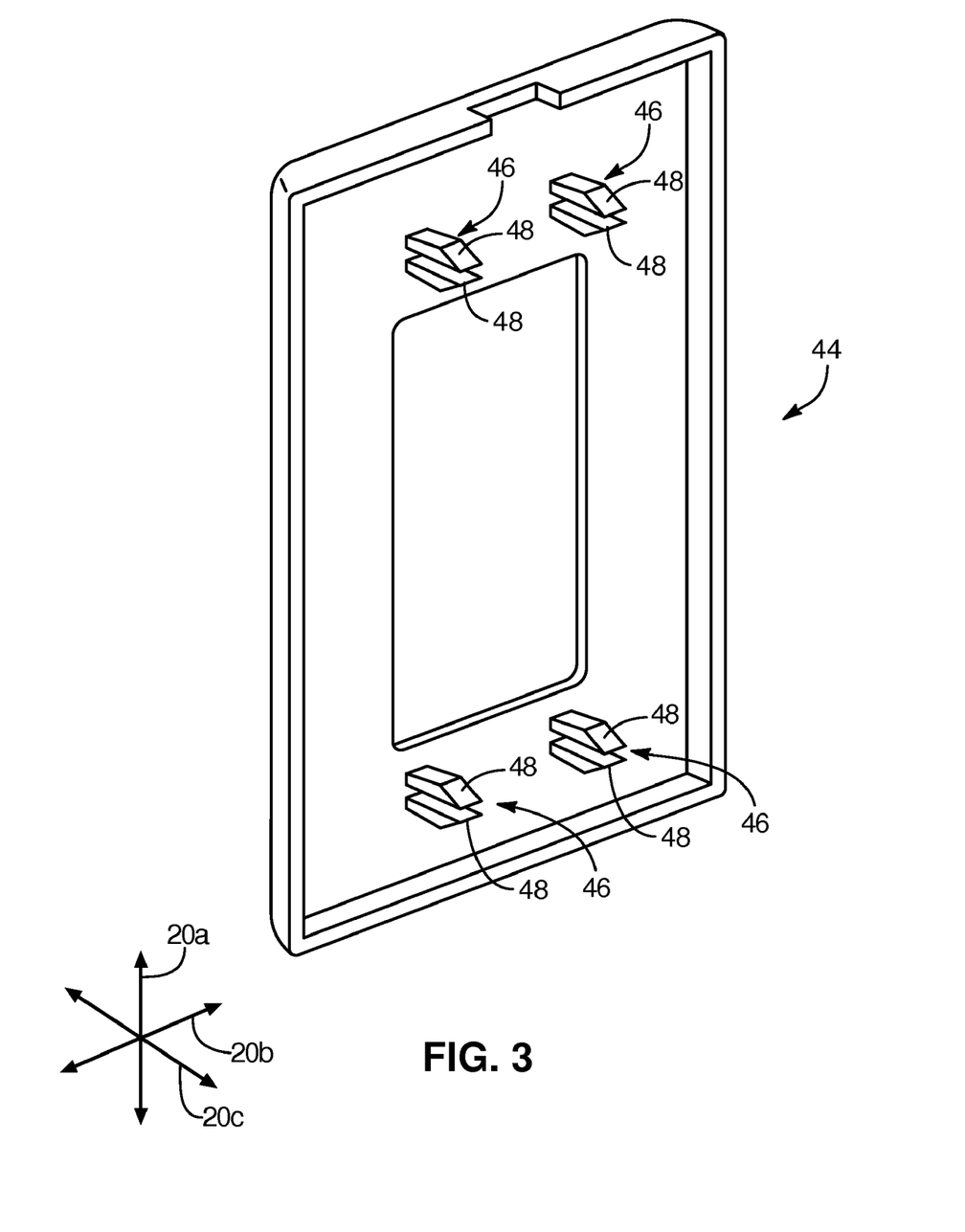
FIG. 3 is a perspective view of one embodiment of a face plate in accordance with the present invention for covering an electrical fixture such as that of FIG. 1.
Figure 4:
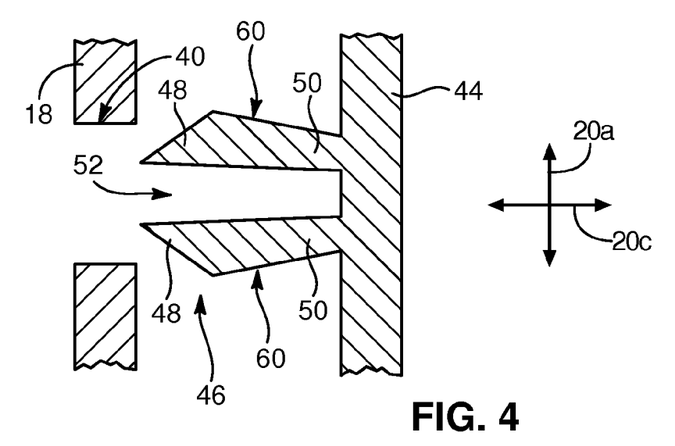
FIG. 4 is a side, cross-sectional view of an engagement prong of a face plate approaching an engagement aperture formed in the flange of a safety strap in accordance with the present invention.
Figure 5:
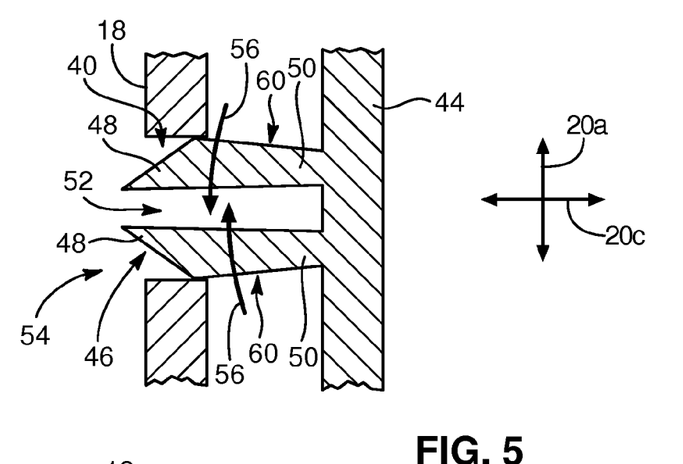
FIG. 5 is a side, cross-sectional view of an engagement prong of a face plate deflecting inward to facilitate insertion thereof into an engagement aperture formed in the flange of a safety strap in accordance with the present invention.
Figure 6:
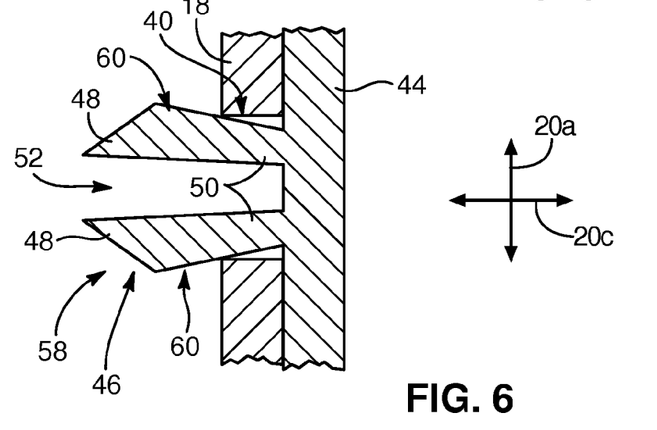
FIG. 6 is a side, cross-sectional view of an engagement prong of a face plate resiliently returned to its original shape once insertion is completed into an engagement aperture formed in the flange of a safety strap in accordance with the present invention.

Engagement prongs 46 in accordance with the present invention may have any suitable configuration. The number of prongs 46 may range from one to several and be selected to provide a balanced securement between a face plate 44 and an electrical fixture 10. In one embodiment, an engagement prong 46 is positioned within each of the four quadrants of the face plate 44.

The number of extensions 48 making up each prong 46 may also range from one to several (typically two to four), depending on a desired engagement strength, ease of manufacture, ease of installation, ease of removal, and the like. In one embodiment, each prong 46 includes two extensions 48. Prongs 46 may grip inwardly (between) or outwardly against an aperture 40.

A screwless face plate 44 in accordance with the present invention may be formed of any suitable material. Characteristics considered when selecting a material may include, for example, cost, aesthetics, dielectric constant, thermal capacity, strength, toughness, flexibility, formability, and the like. In one embodiment, a face plate 44 with corresponding engagement prongs 46 may be monolithically formed of a polymer.

Figure 7:
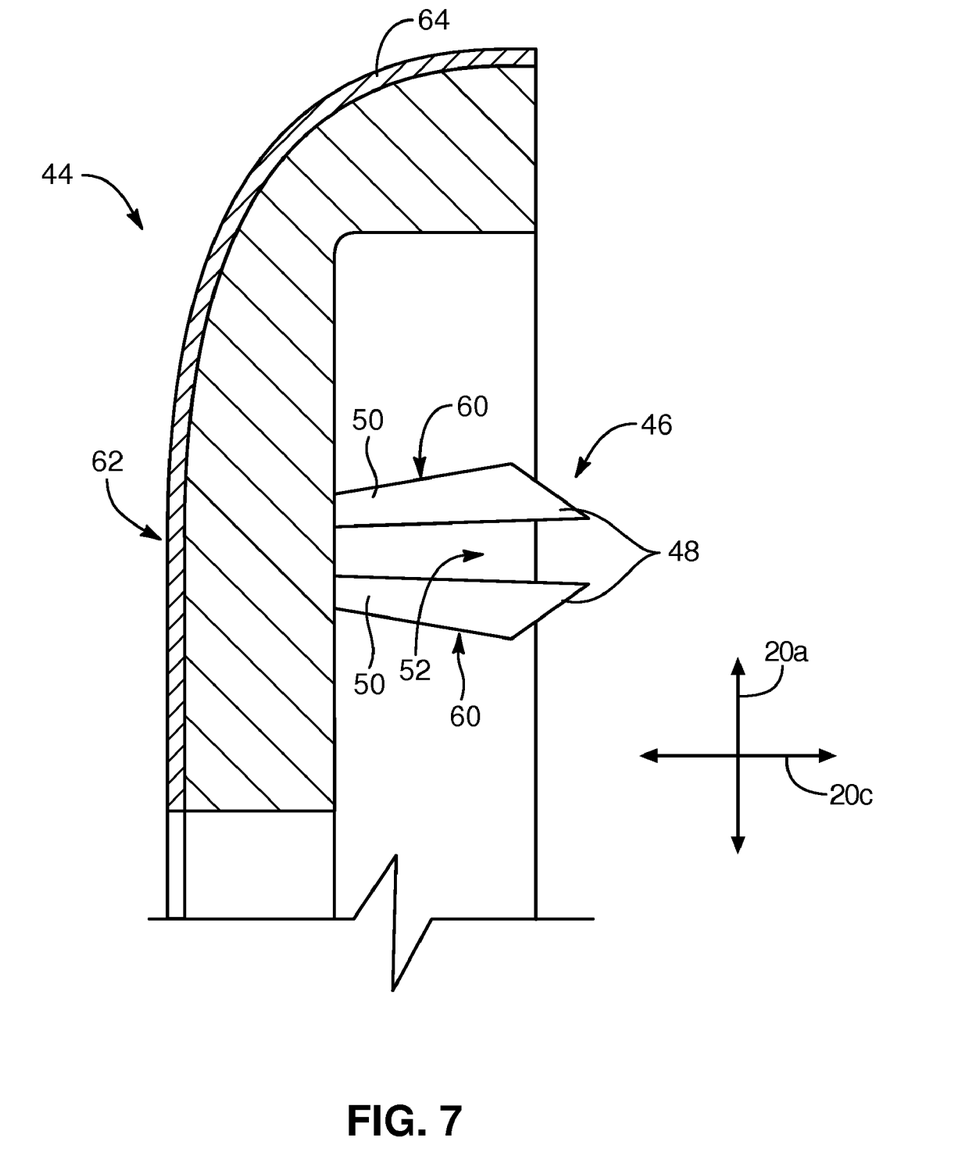
FIG. 7 is a partial, side, cross-sectional view of a face plate laminated with an aesthetic metal covering in accordance with the present invention.

Referring to FIG. 7, in selected embodiments, the exterior face 62 of a face plate 44 may have a coating 64 or laminant 64 applied thereto to provide a particular pattern, appearance, style, finish, or the like. For example, in selected embodiments, a thin metal layer 64 may be applied to the exterior face 62 of a face plate 44. Such a thin metal layer 64, for example, may be formed of brass, brushed brass, nickle, brushed nickle, steel, stainless steel, oxidized iron, tin, aluminum, brushed aluminum, copper, oxidized copper, brushed copper, or the like. In one embodiment, the coating 64 may be applied in a lamination process using an adhesive. Other coating techniques are available.

Figure 8:
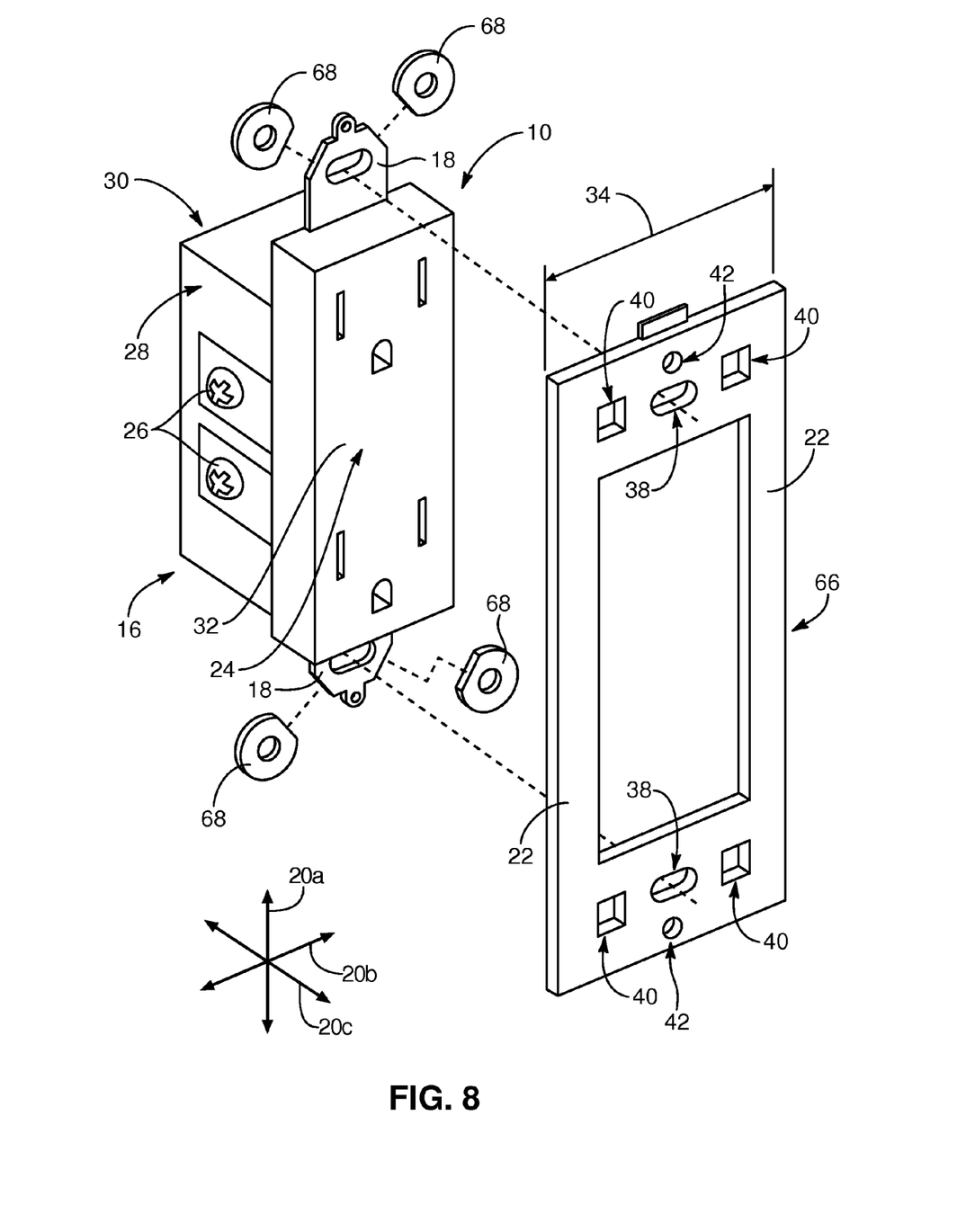
FIG. 8 is a perspective, exploded view of one embodiment of a wide adapter in accordance with the present invention with a corresponding conventional electrical fixture to which the adapter may be retrofit.

Referring to FIG. 8, in selected embodiments, it may be desirable to use a screwless face plate 44 as illustrated in FIG. 3 with a conventional electrical fixture 10. In such embodiments, an adapter 66, formed as a distinct and independent piece, may include the skirting 22 and apertures 38, 40, 42 necessary to interface between the face plate 44 and the conventional electrical fixture 10. The fasteners used to secure a conventional electrical fixture 10 to a connection box 12 may also secure the adapter 66 to the electrical fixture 10. Alternatively, the fasteners used to secure anchors 14 to an electrical fixture 10 may also secure the adapter 66 to the electrical fixture 10.

In certain embodiments, prongs 46, extending through the apertures 40 of an adapter 66, may interfere with the extensions 68 or "rabbit ears" sometimes found on the flanges 18 of conventional electrical fixtures 10. In such embodiments, the extensions 68, typically already scored, may be broken off to provide proper clearance for the prongs 46.

An adapter 66 in accordance with the present invention may be formed of any suitable material. Suitable materials may include conductors as well as dielectrics. For example, in one embodiment, an adapter 66 may be formed of a tough and hard polymer exhibiting certain dielectric properties and suitable for accepting pigmentation and molding in either a smooth satin or glossy finish. The skirting 22 of an adapter 66 may have dimensions (e.g., width 34) as discussed hereinabove.

Figure 9:
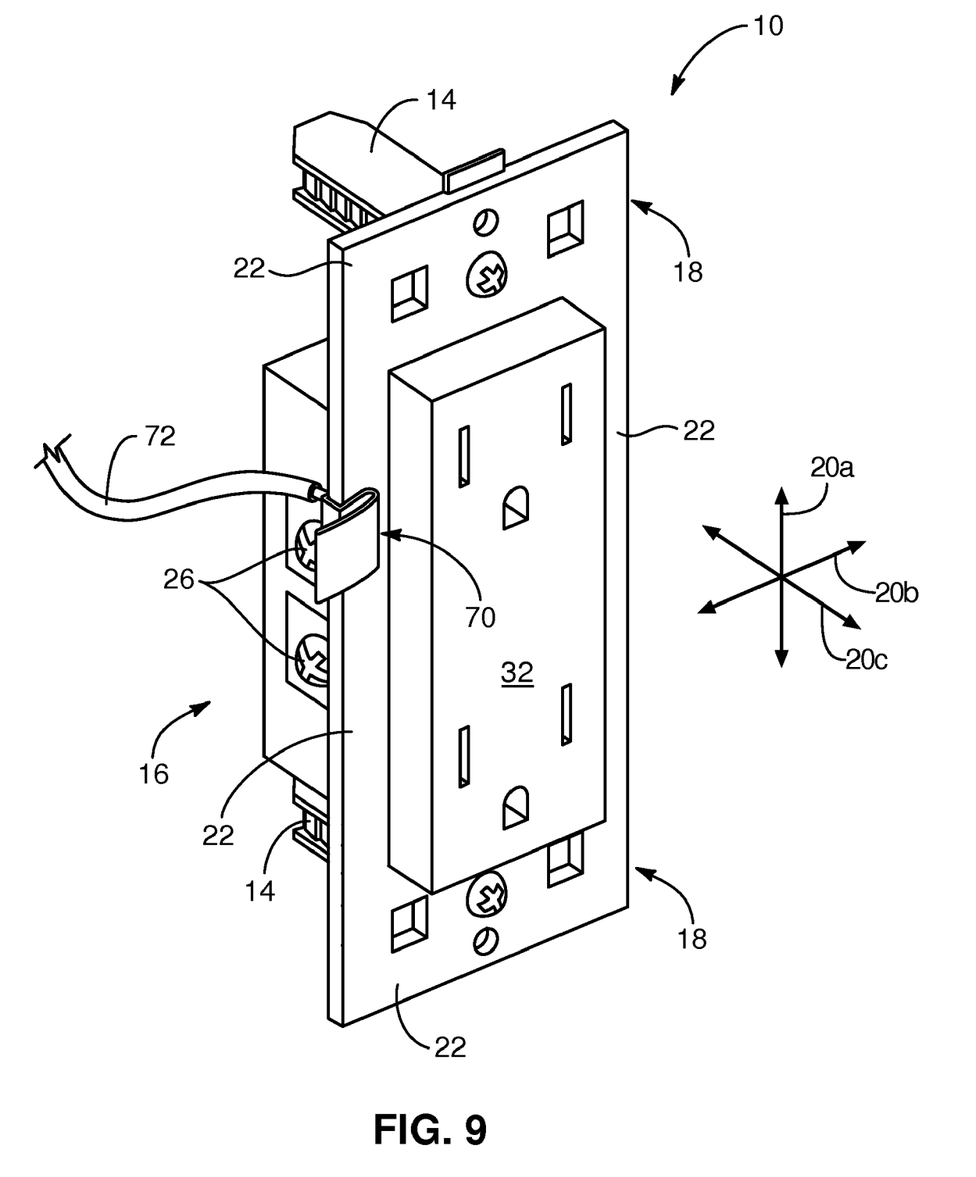
FIG. 9 is a perspective view of the electrical fixture of FIG. 1 with a grounding clip applied thereto for grounding the metal portions of a face plate in accordance with the present invention.
Figure 10:
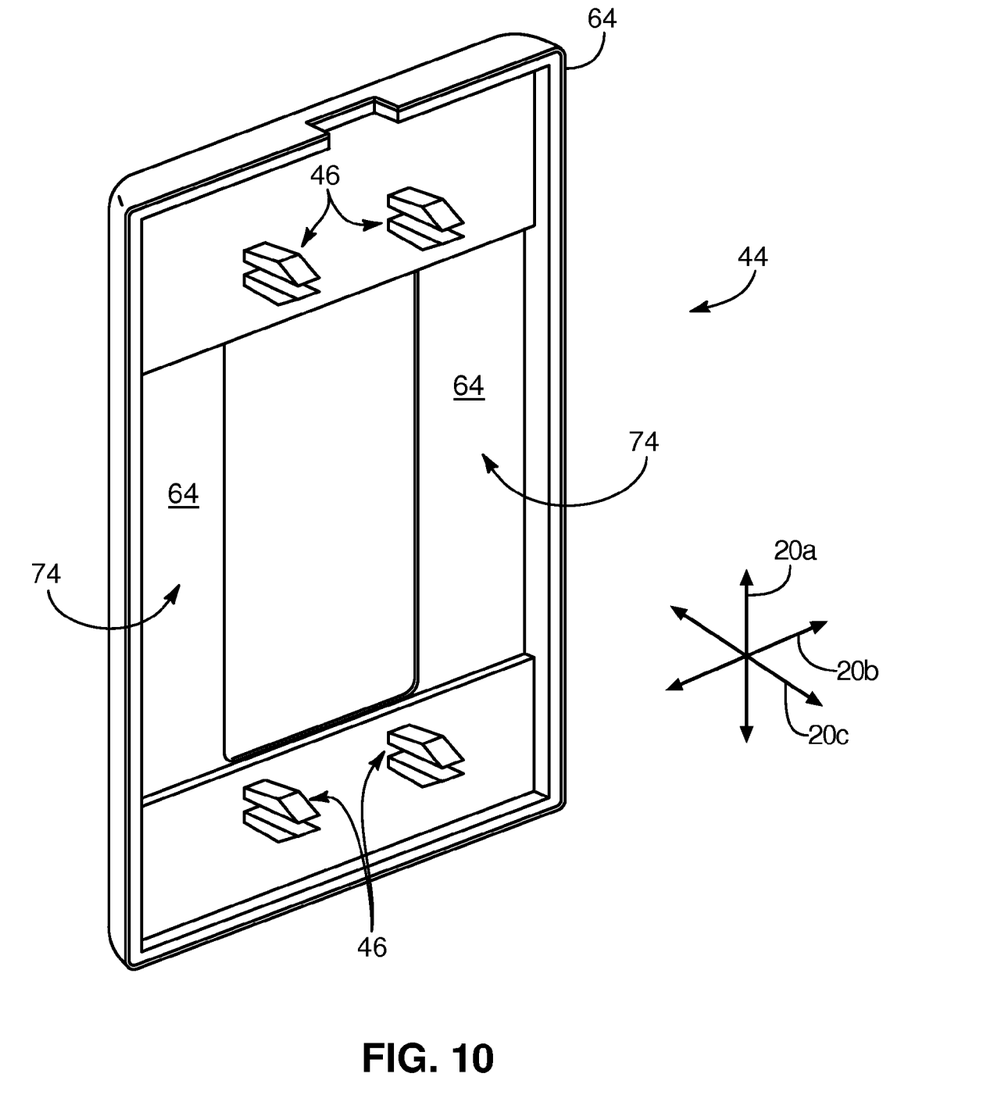
FIG. 10 is a perspective view of a face plate including an aesthetic metal covering and providing exposed portions on the back face of the metal covering to facilitate contact by a grounding clip in accordance with the present invention.

Referring to FIGS. 9 and 10, in certain embodiments, it may be desired or necessary to ground the metal portions of a face plate 44. For example, in selected embodiments, a face plate 44 may have a metal covering 64. Accordingly, building regulations or codes may require that such a metal covering 64 be grounded. Alternatively, the entire face plate 44 may be formed of metal and require grounding.

In traditional installations, the one or more screws used to secure a face plate to the electrical fixture provided a grounding path. That is, metal screws typically formed an electrical connection between a metal face plate and the metal flange or interior of the electrical fixture. This metal flange or interior could then be grounded by a ground wire within the connection box 12.

However, in embodiments in accordance with the present invention, the flange 18 may often be formed of a dielectric material. Prongs 46 extending from a face plate 44 to engage such a flange 18 may be formed of a dielectric material and not provide a grounding path. Moreover, screws (conductive or otherwise) cannot ground a metal face plate (or the metal portions of a face plate) to a flange 18 formed of a dielectric material. Accordingly, in selected embodiments in accordance with the present invention, an electrical fixture 10 may include a grounding clip 70. A grounding clip 70 may be any device that creates a ground path between the metal portion or portions of a face plate 44 and a grounding wire within the connection box 12.

In some embodiments, a grounding clip 70 may engage the skirting 22 of an electrical fixture 10 and extend forward to contact the metal portion or portions of a face plate 44. In selected embodiments, a clip 70 may include a wire lead 72 extending backward toward the interior of the connection box 12. Accordingly, the wire lead 72 may facilitate connection between the clip 70 and the grounding wire within the connection box 12. For example, in certain embodiments, the wire lead 72 may extend a length sufficient to facilitate an engagement with the grounding wire within the connection box 12 using a twist-on wire connector. In other embodiments, the wire lead 72 may be omitted. In such embodiments, the grounding wire within the connection box 12 may extend to contact and engage the clip 70 directly.

In certain embodiments, a clear path may be provided between the grounding clip 70 and the metal portion or portions (e.g., covering 64) of the face plate 44. For example, in one embodiment, the back surface 74 of a metal covering 64 may be exposed in the areas to be positioned transversely 20c adjacent the portions of the skirting 22 extending in the lateral direction 20b from the body 16 of the electrical fixture 10. So arranged, a grounding clip 70 positioned anywhere along the skirting 22 extending in the lateral direction 20b from the body 16 of the electrical fixture 10 may make grounding contact with the metal covering 64.

Figure 11:
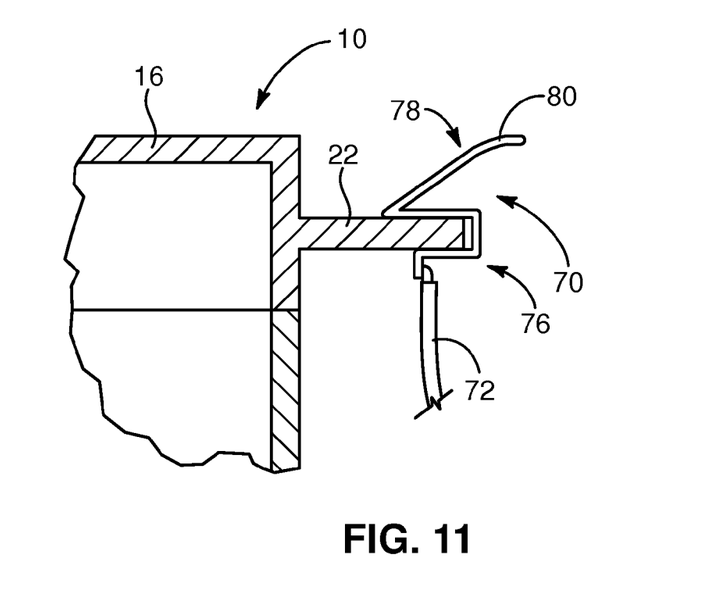
FIG. 11 is a partial, end, cross-sectional view of grounding clip applied to an electrical fixture in accordance with the present invention.
Figure 12:
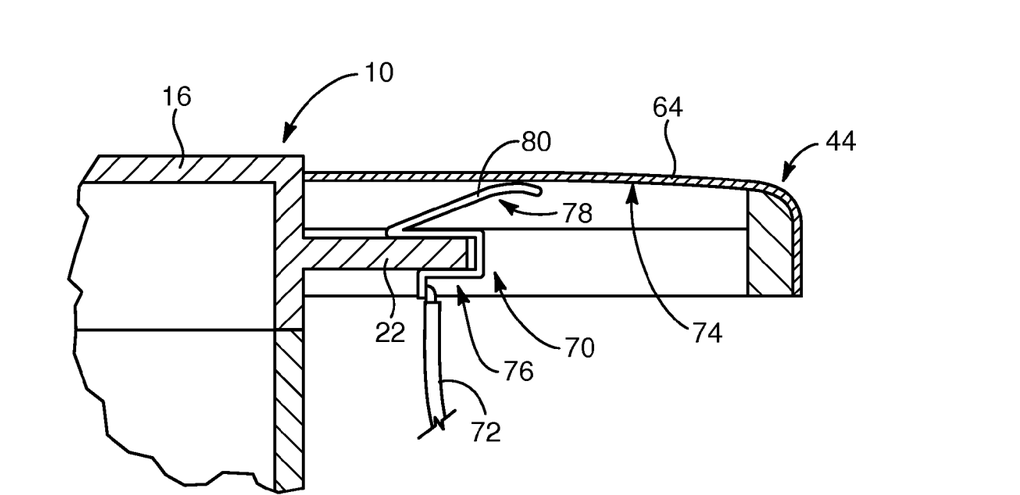
FIG. 12 is a partial, end, cross-sectional view of the grounding clip and electrical fixture of FIG. 11 with the face plate of FIG. 10 applied thereto in accordance with the present invention.

Referring to FIGS. 11 and 12, in selected embodiments, a grounding clip 70 may include an engagement portion 76 and a contact portion 78. The engagement portion 76 may be primarily responsible for securing the clip 70 to the electrical fixture 10 (e.g., to the skirting 22 of the electrical fixture 10). In certain embodiments, the engagement portion 76 may be configured as a spring loaded clamp formed of a conductive material (e.g., thin sheet metal). In such an arrangement, the engagement portion 76 may rely on the resiliency of the conductive material to provide the force necessary to squeeze or grip the skirting 22 therewithin. In some embodiments, the wire lead 72 may extend from one side of the engagement portion 76 while the contact portion 78 extends from the other.

The contact portion 78 of a grounding clip 70 may include an extension 80 or cantilever 80 extending to providing grounding contact with the metal portions of the face plate 44. In selected embodiments, the resiliency of the conductive material forming the contact portion 78 may provide the force necessary to bias the extension 80 or cantilever 80 against the metal covering 64 or other metal portions of the face plate 44. Accordingly, the contact portion 78 may provided adequate grounding contact with face plates 44 of varying dimension or configuration.

Figure 13:
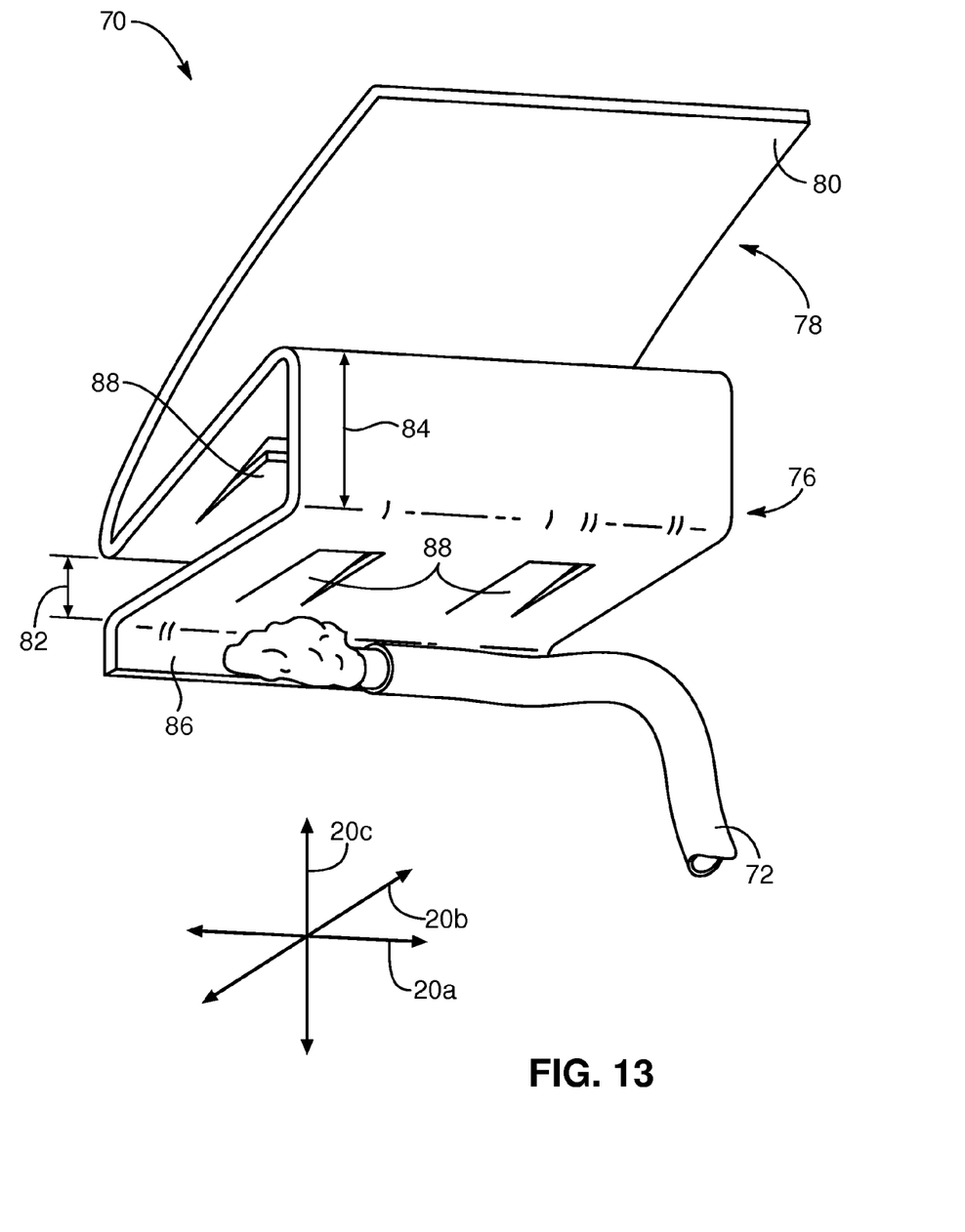
FIG. 13 is a perspective view of one embodiment of a grounding clip with barbs for resisting removal in accordance with the present invention.

Referring to FIG. 13, in selected embodiments, a grounding clip 70 may be formed of a continuous section of thin sheet metal bent as necessary to form the engagement portion 76 and the contact portion 78. If desired or necessary, in a neutral position, the mouth of the engagement portion 76 may have an opening height 82 less than the height 84 at the back of the engagement portion 78. Once installed, this bias may improve the ability of the engagement portion 76 to squeeze or grip the electrical fixture 10 in the transverse direction 20c.

A lead wire 72 may secure to a grounding clip 70 in any suitable manner. For example, in selected embodiments, the engagement portion 76 of the grounding clip 70 may include a lip 86 extending in substantially the transverse direction 20c. The lip 86 may facilitate application of the clip 70 to the electrical fixture 10. Additionally, the lip 86 may provide a location for securing the wire lead 72. In some embodiments, the lip 86 may provide a location to solder the wire lead 72 to the clip 70. In other embodiments, a lip 86 may provide the material necessary for crimping the wire lead 72 to the clip 70. Alternatively, the lip 86 may provide a location for securing the grounding wire extending from within the connection box 12. If desired or necessary, the lip 86 may be omitted. In such embodiments, the wire lead 72 or grounding wire extending from within the connection box 12 may connect to the grounding clip 70 at some other location.

In certain embodiments, a grounding clip 70 may be configured to resist removal after installation. For example, in some embodiments, the engagement portion 76 of a grounding clip 70 may include one or more barbs 88. Such barbs 88 may permit the engagement portion 76 to be advanced unto the electrical fixture 10, yet bite into the electrical fixture 10 to resist a removal force. In selected embodiments, the one or more barbs 88 may be formed in a stamping process where an inwardly directed cantilever is cut from the base material of the engagement portion 76.

Figure 14:
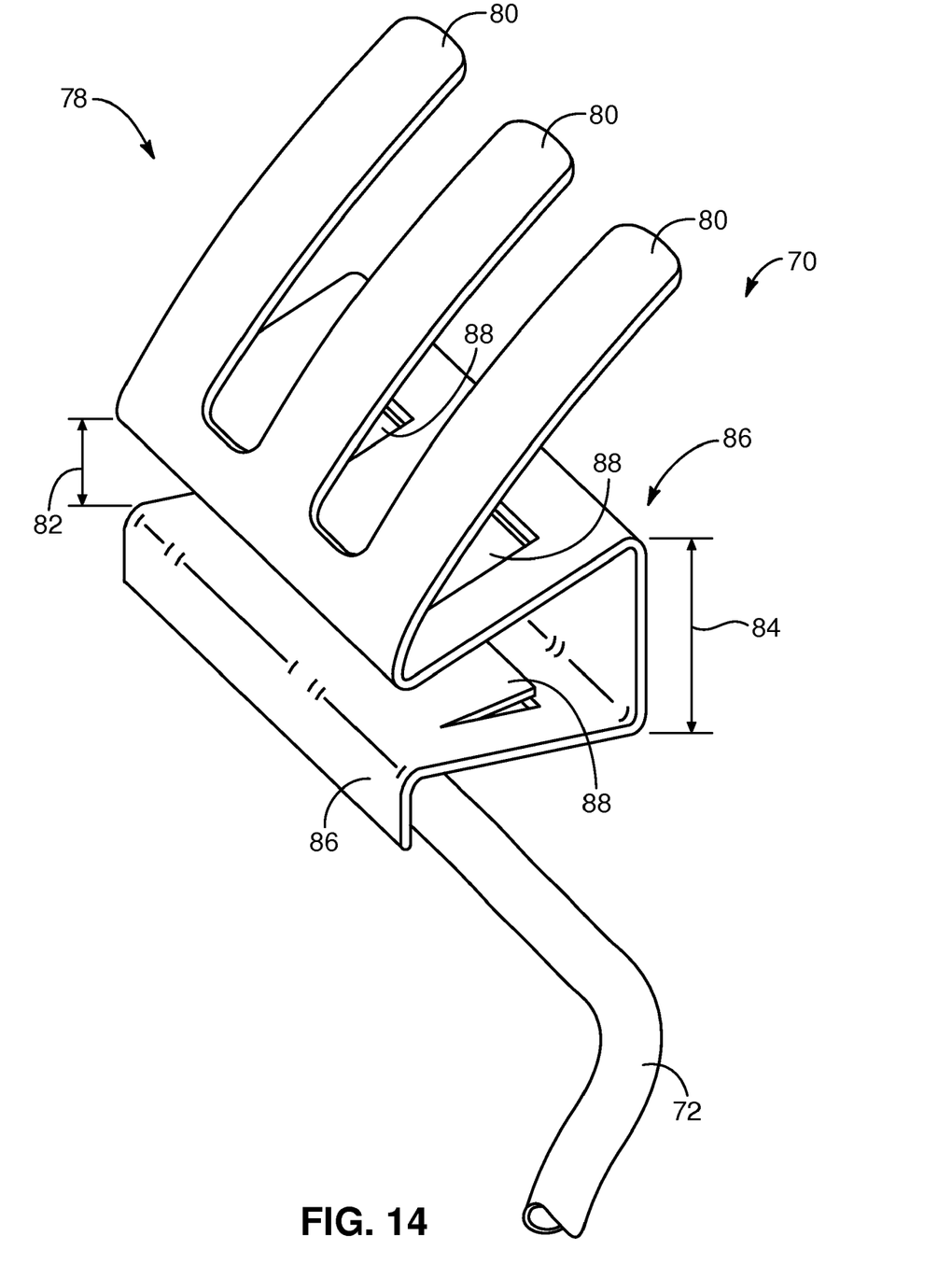
FIG. 14 is a perspective view of one embodiment of a grounding clip with multiple extensions in accordance with the present invention.

Referring to FIG. 14, in selected embodiments, the contact portion 78 of a grounding clip 70 may be formed to include more than one extension 80 or cantilever 80 extending to providing grounding contact with the metal portions of the face plate 44. The different extensions 80 may extend to contact different metal portions of the face plate 44. Alternatively, the different extensions may increase the likelihood that at least one adequate grounding contact will be formed. That is, an obstacle or irregularity stopping one extension 80 from making proper contact should not stop the other extensions 80 from making contact. Accordingly, the grounding clip 70 may continue to perform its intended function.

If desired or necessary, more than one grounding clip 70 may be applied to an electrical fixture 10. For example, a first grounding clip 70 may ground a first metal portion of a face plate 44, while a second grounding clip 70 may ground a second metal portion of the face plate 44.

Figure 15:
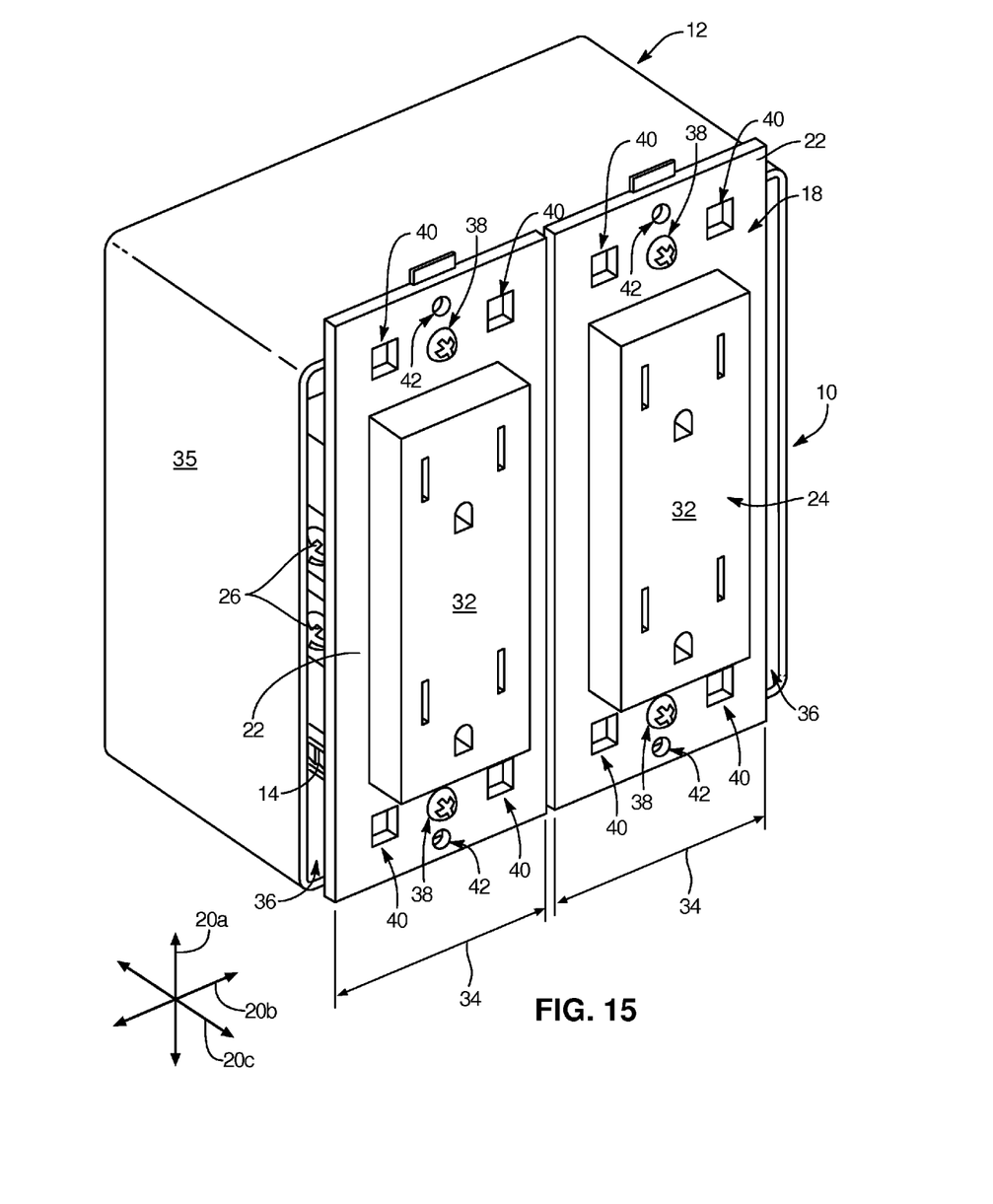
FIG. 15 is a perspective view of two electrical fixtures having a wide safety strap in accordance with the present invention positioned within a multi-gang connection box.

Referring to FIG. 15, as noted hereinabove, in selected embodiments, the skirting 22 may extend in the lateral direction 20b an amount sufficient to stop objects of a codified size from being inserted within the connection box 12 (e.g., within the gap 36 between the skirting 22 and the open face of the connection box 12) to the point where they may contact a terminal 26. Additionally, the width 34 of the skirting 22 may be selected to permit multiple electrical fixtures 10 to be installed laterally 20b adjacent one another in a multi-gang connection box 12. In certain embodiments, the skirting 22 may extend in the longitudinal direction 20a sufficiently to hold the electrical fixture 10 flush with any wall paneling surrounding the connection box 12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A fixture configured to be secured to a connection box and be at least partially covered by a face plate, the fixture comprising:
   a main body having a front portion, a side portion and a back portion;
   a strap extending from the main body, the strap having a skirting configured to limit access from the front portion to at least one of the side portion and the back portion of the main body, the strap defining at least one face plate engagement aperture configured to receive a prong extending from the face plate in a manner that secures the face plate to the fixture, the strap being configured to directly engage a wall to which the connection box is mounted; and
   at least one anchor secured to and extending from the strap and configured to engage the connection box for securing the fixture to the connection box.

2. The fixture of claim 1, wherein the fixture is a power receptacle and the main body includes a first electrical socket and a second electrical socket.

3. The fixture of claim 1, wherein the strap is integrally formed with the fixture as a one-piece member.

4. The fixture of claim 1, wherein the skirting defines at least one anchor securement aperture configured to receive a fastener for securing the at least one anchor to a backside of the skirting.

5. The fixture of claim 1, wherein the skirting is configured to extend beyond an outer periphery of the connection box and hold the fixture flush with the wall to which the connection box is mounted.

6. The fixture of claim 1, wherein the at least one face plate engagement aperture comprises a first face plate engagement aperture and a second face plate engagement aperture.

7. The fixture of claim 6, wherein the first face plate engagement aperture and the second face plate engagement aperture are rectangular in shape.

8. The fixture of claim 4, wherein the at least one face plate engagement aperture comprises a first face plate engagement aperture and a second face plate engagement aperture, and the anchor securement aperture is located between the first face plate engagement aperture and the second face plate engagement aperture.

9. A device configured to be secured to a connection box, the device comprising:
   an electrical fixture including a main body having a front portion, a side portion and a back portion; and
   a strap secured to the electrical fixture, the strap having a skirting that surrounds a periphery of the electrical fixture and limits access from the front portion to at least one of the side portion and the back portion of the electrical fixture, the strap defining an anchor securement aperture configured to receive a fastener for securing the electrical fixture to the connection box and defining at least one face plate engagement aperture configured to receive a prong extending from a face plate in a manner that secures the face plate to the electrical fixture, the strap being configured to directly engage a wall to which the connection box is mounted; and
   at least one anchor secured to and extending from the strap and configured to engage the connection box for securing the fixture to the connection box.

10. The device of claim 9, wherein the electrical fixture includes at least one flange extending from the main body, the at least one flange defining an aperture configured to receive a fastener for securing the strap to the electrical fixture.

11. The device of claim 10, wherein the at least one anchor extends from a backside of the strap.

12. The device of claim 11, further comprising a threaded fastener passing through the anchor securement aperture and the aperture of the at least one flange for securing the at least one anchor to the strap, the at least one flange being positioned between the strap and the at least one anchor.

13. The device of claim 9, further comprising:
   the face plate configured to be secured to the skirting, the face plate including at least one prong that is configured to be inserted into the at least one face plate engagement aperture,
   wherein the at least one prong is not visible from a front side of the face plate.

14. The device of claim 13, wherein the electrical fixture is a power receptacle and main body includes a first electrical socket and a second electrical socket.

15. A strap configured to be secured to an electrical fixture that is received by a connection box and be at least partially covered by a face plate, the strap comprising:
   a skirting configured to surround a periphery of the electrical fixture, the skirting defining an opening configured to receive the electrical fixture and at least one face plate engagement aperture configured to receive a prong extending from the face plate in a manner that secures the face plate to the skirting, the skirting being configured to directly engage a wall to which the connection box is mounted; and
   at least one anchor secured to and extending from the skirting and configured to engage the connection box for securing the electrical fixture to the connection box,
   wherein the skirting is configured to limit access from a front portion to at least one of a side portion and a back portion of the electrical fixture.

16. The strap of claim 15, wherein the strap is formed of a dielectric material.

17. The strap of claim 15, wherein the strap is formed as a one-piece member.

18. The strap of claim 15, wherein the skirting is configured to engage an edge of the connection box to which the electrical fixture is secured.

19. The strap of claim 15, wherein the skirting defines at least one anchor securement aperture configured to receive a fastener for securing the at least one anchor to a backside of the skirting.

20. The strap of claim 15, wherein the skirting defines at least one face plate securement aperture configured to receive a screw for securing a traditional face plate to the skirting.

21. The strap of claim 15, further comprising a grounding clip engaging the skirting, the grounding clip being configured to ground the face plate that is at least partially formed of a conductive material to the connection box.

22. The strap of claim 15, wherein the skirting is integrally formed with the electrical fixture as a one-piece member.

23. The strap of claim 15, wherein the skirting surrounds the periphery of the electrical fixture in a continuous manner.

24. The strap of claim 15, wherein the at least one face plate engagement aperture has a cross sectional shape that is substantially rectangular.

25. The strap of claim 15, wherein the skirting has a peripheral shape that is substantially rectangular.

26. The strap of claim 15, wherein the at least one anchor extends from a backside of the strap.

\* \* \* \* \*